H. C. BROWN.
HOOK.
APPLICATION FILED DEC. 1, 1908. RENEWED MAR. 9, 1910.

979,926.

Patented Dec. 27, 1910.

WITNESSES
E. G. Bromley

INVENTOR
Harry C. Brown
BY
ATTORNEYS

UNITED STATES PATENT OFFICE.

HARRY CLARENCE BROWN, OF SPRING VALLEY, NEW YORK.

HOOK.

979,926.  Specification of Letters Patent.  Patented Dec. 27, 1910.

Application filed December 1, 1908, Serial No. 465,505. Renewed March 9, 1910. Serial No. 548,311.

*To all whom it may concern:*

Be it known that I, HARRY C. BROWN, a citizen of the United States, and a resident of Spring Valley, in the county of Rockland and State of New York, have invented certain new and useful Improvements in Hooks, of which the following is a specification, taken in connection with the accompanying drawing, which forms a part of the same.
This invention relates to hooks for universal application.

While I have shown my hook used in connection with a cross chain for anti-skidding devices for automobile tires, it is to be understood that this is only one of its many uses, for it may be employed as a connecting link, repair link for connecting any two objects such for instance as the links of an ordinary chain, or the links of a driving chain, or be used as a harness snap hook, grab hook, slip hook, lumber hook, and in fact be put to any use where a hook is or may be used.

Figure 1:
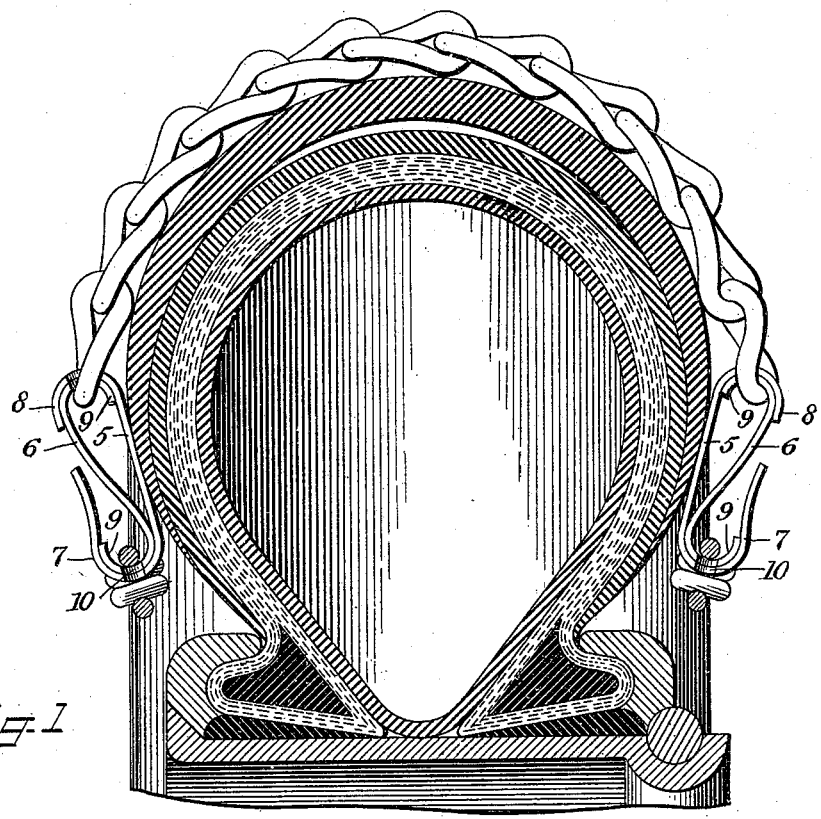
Figure 2:
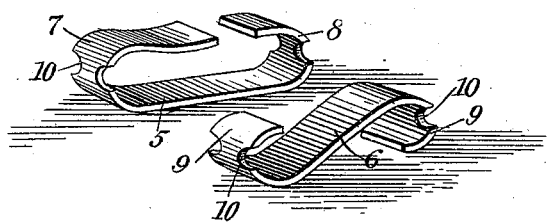

More particularly it comprises a hook made of two readily separable coöperating parts which jointly form a closed eye in the hook, which eye can be readily opened by simple manipulation of the parts of the hook by the fingers of the operator and without the aid of any tools.
In the accompanying drawing showing an illustrative embodiment of this invention and in which the same reference numerals refer to similar parts in the several figures, Figure 1 is a vertical section through an automobile tire, showing my hook in side elevation and used in connection with the cross chain of an anti-skidding device; Fig. 2 is a perspective view of the parts of the hook separated.
My invention consists broadly of an outer member 5 formed of any suitable material having its ends bent up to form hooks 7 and 8, and an inner movable member adapted to slide and fit within the outer member and close the opening between the hooks 7 and 8 of that member to prevent the unauthorized or accidental passage of the link or other object to which the hook may be removably secured. Preferably this inner member of the hook is so formed as to make with the hook 8 of the outer member a closed eye for the reception of the link or other object to which the hook is secured.

In the particular form of my invention illustrated the inner member consists of a member 6 having one or both of its opposite ends bent to form one or two hooks 9, 9. If only one hook 9 is used it would be upon that end of the member 6 which would cooperate with the hook 8 so that together these two hooks would form a closed eye for the reception of a link of a chain or other object which was to be temporarily secured to the hook.

I preferably, though not necessarily, provide one of the hooks of the outer member with an extension which forms a lip. When this outer member is formed of resilient material this lip will yield to receive an object in the hook 7. To insert a chain or other object in the eye of the hook the inner member 6 is removed by sliding it out of the outer member 5 and then bringing the link, or other object, into a position substantially at right angles to the length of the member 6 so that a portion of the link will slip between the end of the hook 8 and the end of the lip which is secured to the hook 7. Then when the inner member 6 is brought home or nested within the outer member 5 the link or other object is brought into substantially the same plane as the outer member 5 when it will be seen that the link or other object secured will be securely held within the closed eye formed by the hook 8 and the hook 9 which coöperates with it. To remove the chain or other object temporarily secured within the closed eye of the hook this operation is reversed; the link is brought into a position substantially at right angles to the inner member 6 and between the end of the hook 8 and the lip secured to the hook 7 and then pressure is applied to the chain, which, being transmitted to the inner member 6, will cause it to readily slip out of the outer member 5 thereby opening the eye of the hook and permitting the removal of the old chain and the insertion of a new one, or other object, as may be desired. As an additional feature and in some cases, though not necessarily, I form notches 10, 10 in one or more of the coöperating hooks forming the complete hook of my invention. In the drawing I have shown these notches 10, 10 formed in each of the hooks 7, 8 and 9, but, of course, it is to be distinctly understood that these may be omitted without departing from my invention, or that the notches may be used merely upon one of the hooks 9 and its particular coöperating hook 7 or 8, as the case may be. These notches tend to prevent the pulling out of the different hooks 7, 8 and 9 due to any excessive strain which may be thrown upon them. By such an arrangement the link of the chain, or other similar coöperating part, if the hook is not used with a chain, becomes seated in the notches 10, 10 and to straighten out the different elements of the hook it would be necessary to pull a wider portion of the hooks 7, 8 and 9, as the case may be, through a narrower portion of the chain link or similar coöperating part, if the hook be not used with a chain.

When my hook is used with cross chains forming portions of anti-skidding devices, it is apparent that by simple manipulation the end of the cross chain can be removed from the closed eye of the hook by slipping out the inner member 6 from the outer member 5 permitting the ready substitution of a new cross chain, or the reversal of the old one in case it has not been completely worn out. Furthermore this can be done quickly and expeditiously without the aid of any tools. The hooks may be used indefinitely outlasting many sets of chains. It is also to be noted that the wear in the hook itself comes principally upon the inner member 6 and that the entire hook can be readily repaired or renewed by simply inserting a new inner member 6 when the previous one has become unserviceable from wear or any other cause.

My hook is particularly advantageous as a repair hook for connecting together the ends of a broken chain or other object for as often happens a chain will break at a point removed from a forge so that the break cannot be mended by opening a link and welding its ends together after inserting the other end of the chain. It is apparent that by the manipulation previously described, one end of the broken chain can be inserted in the closed eye of the hook, while the other end of the chain can be made to engage with the open hook formed by the hooks 7 and 9, if two hooks be located on the inner member 6 which is the preferred form. By forming my hook with an open non-welded eye it can be used for numerous purposes for as the eye is not welded or permanently closed it is not necessary to resort to the use of tools. Instead of opening a link and applying it to the closed eye of a hook and then welding the ends of the link, my hook is secured to the chain without any welding operation. The members 5 and 6 may be given various forms and contours and be formed of various materials, but preferably they are bent up from strips of metal.

Having thus described this invention in connection with an illustrative embodiment thereof to the details of which I do not desire to be limited, what is claimed as new and what it is desired to secure by Letters Patent is set forth in the appended claims.

1. A hook comprising a member having a hook at each end and at the same side thereof, and a member having a hook at each end and opposite sides thereof, fitting within the first mentioned member.

2. A hook comprising a member having a hook at each end thereof, and a member having a hook at each end thereof and slidable edgewise within the first mentioned member, the hooks of each member having notches in the edges which register when the hooks are assembled.

3. A hook comprising a member having a hook at each end thereof, and a second member having hooks at the ends thereof arranged at opposite sides, with the second member slidable edgewise within the first and held against relative endwise movement by the first mentioned member.

4. A hook comprising a member having a hook at each end thereof, one of said hooks being provided with an extended lip, and a second member having a hook at each end thereof and fitting within the first mentioned member, said extended lip and the body of the second member forming a contracted opening.

5. A hook open at one end and closed at the opposite end and composed of two separable hooked members, with one of said members fitting within the other.

6. A hook comprising two members slidably and normally separably connected together by sliding one transversely to the other and one snugly fitting the other, a hook provided on each end of the outer member, the inner member provided with a hook, said member bridging the opening between the hooks of the outer member and preventing the accidental or unintentional escape of the link or object to which the hook is permanently but removably secured.

7. A hook comprising two slidably and normally separably connected members, said members being normally connected and disconnected by sliding one transversely to the other, one snugly fitting the other, a hook formed on each end of the outer member, the inner member provided with a hook to coöperate with one of the other hooks to form a closed eye.

8. A hook comprising two slidably connected members, one nesting within the other, one hook formed on each end of the outer member, a spring lip on one of the hooks, the inner member provided with a hook to coöperate with a hook of the outer member to form a closed eye.

9. A hook comprising two members slidably connected together and one nesting within the other, a hook provided on each end of the outer member, one of said hooks being provided with a notch, the inner member provided with a hook which has a notch to coöperate with the notch in the outer member.

10. A hook comprising two slidably and separably connected members, one nesting within the other, a hook formed on each end of the outer member, the inner member provided with a hook to coöperate with one of the other hooks to form a closed eye, said inner member snugly fitting the outer member and normally separable from it by sliding it at right angles to the longitudinal axis of the outer member.

11. A hook comprising two substantially rigid members slidably and removably connected together, the outer member being provided with hooks, one at each end and with a spring lip, and the inner member being provided with one or more hooks.

12. A hook comprising two members, the outer member being provided with a hook at each of its ends, one of the hooks adapted to be permanently but detachably connected to a chain or similar article, and an inner member provided with one or more hooks and said hook or either of them adapted to coöperate with one of the hooks of the outer member to permanently but detachably secure the chain or similar article in the outer member, leaving the other hook of the outer member free to detachably engage an object, the inner and outer members being slidably and detachably connected together.

13. A hook comprising two members slidably connected together and one nesting within the other, a hook provided on each end of the outer member, both of said hooks being provided with notches, the inner member provided with a hook which has a notch to coöperate with either of the notches in the outer member.

In testimony whereof I have signed my name to this specification in the presence of two subscribing witnesses.

HARRY CLARENCE BROWN.

Witnesses:
W. W. HOLT,
JOHN P. DAVIS.